US009057786B2

(12) United States Patent
Walerow et al.

(10) Patent No.: US 9,057,786 B2
(45) Date of Patent: Jun. 16, 2015

(54) ALGORITHM FOR A WIRELESS, MOTION AND POSITION-SENSING, INTEGRATING RADIATION SENSOR FOR OCCUPATIONAL AND ENVIRONMENTAL DOSIMETRY

(71) Applicant: Landauer, Inc., Glenwood, IL (US)

(72) Inventors: P. Alexander Walerow, Momence, IL (US); Mark R. Salasky, St. John, IN (US); Daniel J. Valentino, Naperville, IL (US); Brahim Moreno, L'Hay-les-Roses (FR); Marc Million, Bourg la Reine (FR)

(73) Assignee: LANDAUER, INC., Glenwood, IL (US)

( * ) Notice: Subject to any disclaimer, the term of this patent is extended or adjusted under 35 U.S.C. 154(b) by 0 days.

(21) Appl. No.: 14/288,822

(22) Filed: May 28, 2014

(65) Prior Publication Data

US 2014/0278261 A1    Sep. 18, 2014

Related U.S. Application Data

(63) Continuation-in-part of application No. 13/908,372, filed on Jun. 3, 2013, now Pat. No. 8,803,089, and a continuation-in-part of application No. 13/906,553, filed on May 31, 2013, now Pat. No. 8,822,924.

(60) Provisional application No. 61/654,162, filed on Jun. 1, 2012.

(51) Int. Cl.
*G01J 1/00* (2006.01)
*G01T 1/02* (2006.01)
*G01T 7/00* (2006.01)

(52) U.S. Cl.
CPC .... *G01T 1/02* (2013.01); *G01T 7/00* (2013.01)

(58) Field of Classification Search
CPC .................................. G01T 1/02; G06F 17/16
See application file for complete search history.

(56) References Cited

U.S. PATENT DOCUMENTS

| 3,646,347 | A | 2/1972 | Farmer et al. |
|---|---|---|---|
| 4,671,189 | A | 6/1987 | David |
| 5,731,590 | A | 3/1998 | Miller |
| 5,739,541 | A | 4/1998 | Kahilainen |
| 5,892,234 | A | 4/1999 | McKeever et al. |
| 5,962,857 | A | 10/1999 | McKeever et al. |
| 6,127,685 | A | 10/2000 | Yoder et al. |
| 6,172,368 | B1 | 1/2001 | Tarr et al. |
| 6,198,108 | B1 | 3/2001 | Schweitzer et al. |

(Continued)

FOREIGN PATENT DOCUMENTS

| JP | 07311272 A | 11/1995 |
|---|---|---|
| JP | 2007205766 A | 8/2007 |

(Continued)

OTHER PUBLICATIONS

Hamacher et al., "Inverse radiation therapy planning—a multiple objective optimization approach," 2002, Discrete Applied Mathematics, vol. 118, pp. 145-161.*

(Continued)

*Primary Examiner* — Kiho Kim
(74) *Attorney, Agent, or Firm* — Alchemy-Partners, PC

(57) ABSTRACT

Described is an apparatus, method and machine-readable medium for determining radiation dosages based on a solution vector for each radiation field and an objective function.

48 Claims, 2 Drawing Sheets

(56) References Cited

U.S. PATENT DOCUMENTS

| | | | |
|---|---|---|---|
| 6,604,711 | B1 | 8/2003 | Stevens et al. |
| 6,846,434 | B2 | 1/2005 | Akselrod |
| 7,098,470 | B2 | 8/2006 | Akselrod et al. |
| 7,865,277 | B1 | 1/2011 | Larson et al. |
| 7,964,851 | B2 | 6/2011 | Fehrenbacher |
| 2003/0031298 | A1 | 2/2003 | Xing |
| 2004/0021087 | A1 | 2/2004 | Tokhtuev et al. |
| 2006/0043304 | A1 | 3/2006 | Miller et al. |
| 2006/0185434 | A1 | 8/2006 | Bernhagen |
| 2008/0217551 | A1 | 9/2008 | Zhang et al. |
| 2009/0010390 | A1 | 1/2009 | Saoudi et al. |
| 2009/0020703 | A1 | 1/2009 | Buckley et al. |
| 2009/0102296 | A1 | 4/2009 | Greene et al. |
| 2010/0315203 | A1 | 12/2010 | Peden, Ii et al. |
| 2012/0041685 | A1 | 2/2012 | Ding et al. |
| 2012/0132806 | A1 | 5/2012 | Findlay et al. |
| 2013/0320212 | A1 | 10/2013 | Valentino et al. |

FOREIGN PATENT DOCUMENTS

| | | | |
|---|---|---|---|
| KR | 20040019525 | A | 3/2004 |
| KR | 1020040019525 | A | 3/2004 |
| WO | 2013066882 | A1 | 5/2013 |

OTHER PUBLICATIONS

Examination Report received in related Great Britain Application No. GB 1420470.5, mailed Dec. 24, 2014.

International Search Report and Written Opinion dated Oct. 28, 2013 in corresponding International Application No. PCT/IB2013/054517.

Botter-Jensen, L., et al., "Optically Stimulated Luminescence Dosimetry," Elsevier, 2003.

Klemic, G., et al., "External Dosimetry in the Aftermath of a Radiological Terrorist Event," Radiation Protection Dosimetry, vol. 120, No. 1-4, pp. 242-249, 2006.

Akselrod, M.S., et al., "Preparation and Properties of $Al_2O_3$:C," Radiation Protection Dosimetry, vol. 47, No. 1-4, pp. 159-164, 1993.

Akselrod, M.S., et al., "Optically Stimulated Luminescence of $Al_2O_3$," Radiation Measurements, vol. 29, No. 3-4, pp. 391-399, 1998.

N. Stanford, Whole Body Dose Algorithm for the Landauer in Light Next Generation Dosimeter, Algorithm Revision: Next Gen IEC; Sep. 13, 2010.

N. Stanford, Whole Body Dose Algorithm for the Landauer in Light Next Generation Dosimeter, Algorithm Revision: Next Gen NVLAP; Sep. 27, 2010.

N. Stanford, "Linear vs. Functional-Based Dose Algorithm Designs," Rad. Prot. Dosim.,144 (1-4), 253-256 (2011).

Xu, Yuan; Neu, Scott; Owens, Chester J.; Owens, Janis F.; Sklansky, Jack; Valentino, Daniel J., "Optimization of active-contour model parameters using genetic algorithms: segmentation of breast lesions in mammograms. Proc. SPIE 4684, Medical Imagin 2002: image Processing," 1406, May 15, 2002; doi:10.1117/12.467106.

J. A. Snyman, Practical Mathematical Optimization: An introduction to Basic Optimization Theory and Classical and New Gradient-based Algorithms. Springer Publishing (2005); ISBN 0-387-24348-8.

X. S. Yang, "Harmony Search as a Metaheuristic Algorithm," in: Music-Inspired Harmony Search Algorithm: Theory and Applications, Studies in Computational Intelligence, Springer Berlin, vol. 191, pp. 1-14 (2009).

International Search Report dated Sep. 18, 2014 in corresponding International Application No. PCT/IB2014/061818.

International Search Report dated Sep. 25, 2014 in corresponding International Application No. PCT/IB2014/061822.

International Search Report dated Sep. 18, 2014 in corresponding International Application No. PCT/IB2014/061819.

* cited by examiner

ALGORITHM FOR A WIRELESS, MOTION AND POSITION-SENSING, INTEGRATING RADIATION SENSOR FOR OCCUPATIONAL AND ENVIRONMENTAL DOSIMETRY

CROSS-REFERENCE TO RELATED APPLICATIONS

This application claims benefit of priority to U.S. Provisional Patent Application No. 61/654,162 to Valentino et al., entitled WIRELESS, MOTION AND POSITION-SENSING, INTEGRATING RADIATION SENSOR FOR OCCUPATIONAL AND ENVIRONMENTAL DOSIMETERY, filed Jun. 1, 2012, and U.S. patent application Ser. No. 13/906,553 to Valentino et al., entitled WIRELESS, MOTION AND POSITION-SENSING, INTEGRATING RADIATION SENSOR FOR OCCUPATIONAL AND ENVIRONMENTAL DOSIMETRY, filed May 31, 2013, of which the present application is a continuation-in-part and U.S. patent application Ser. No. 13/908,372 to Walerow et al., entitled SYSTEM AND METHOD FOR WIRELESS, MOTION AND POSITION-SENSING, INTEGRATING RADIATION SENSOR FOR OCCUPATIONAL AND ENVIRONMENTAL DOSIMETRY, filed Jun. 3, 2013, of which the present application is a continuation-in-part. All of the above patents and patent applications are incorporated herein by reference in their entirety.

BACKGROUND

1. Field of the Invention

The present invention relates to radiation dosimetry systems and, particularly, to accurate calculation of the equivalent absorbed dose due to a radiation exposure event.

2. Background of the Invention

Occupational radiation exposure events can occur in healthcare, the oil and gas industry, the military and other industrial settings where the use of materials or devices that emit ionizing radiation can result in accidental or occupationally unavoidable exposure events.

Emergency radiation exposure events can occur when a Radiological Dispersal Device (RDD), Improvised Nuclear Device (IND), or another source of radioactive material is released and contaminates a given area.

Radiation dosimetry programs for occupational radiation exposure events, and Emergency management plans for emergency radiation exposure events, have been developed to monitor and protect workers or civilians who might be exposed to radiation during a radiation event.

An important aspect of any emergency management plan following a radiation event is to ensure the safety of fire, police and other emergency response personnel ("First Responders"), health-care workers, and citizens that might be exposed to radiation resulting from the radiological or nuclear device. Radiation exposure of first responders and healthcare workers is often, at least partially, monitored using traditional radiation detecting devices; however, monitoring the exposure of potentially tens of thousands of civilians presents a more difficult problem.

Furthermore, after the removable contamination has been eliminated, there may be a need for ongoing, external personal dosimetry monitoring for individual First Responders, healthcare workers, and members of the public. Site restoration could be a lengthy project and, to minimize disruption to society, it may be necessary to allow inhabitants to have access to certain areas before cleanup is complete. For example, allowing citizens to pass through transit centers, thoroughfares, or certain areas of buildings would facilitate government operations, commerce, uniting of families, routine medical treatments, etc. As an individual moves through a contaminated area, it would be valuable to know the dose and time of exposure at each location visited. Such dose measurements could reduce reliance on model-based estimates of dose, and avoid unnecessary area restrictions by providing a geographic map of the dynamic dose distribution reconstructed from a large number of dosimeters collecting dose event data over the potentially still-contaminated area. Unlike cleanup at decommissioned facilities where the public could be excluded with little cost to society, in an urban environment, time is of the essence and the cost of exclusion may be greater than the benefit avoiding exposure to a relatively low radiation dose. After cleanup, personal dosimetry could boost public confidence that their personal dose is below acceptable thresholds, and that the final cleanup was effective.

Several radiation measurement technologies currently exist including TLD dosimeters, OSL dosimeters, electronic dosimeters, quartz or carbon fiber electrets, and other solid-state radiation measurement devices.

Thermoluminescent Dosimeter (TLD) badges are personal monitoring devices using a special material (e.g., lithium fluoride) that retains deposited energy from radiation. TLD badges are read using heat, which causes the TLD material to emit light that is detected by a TLD reader (calibrated to provide a proportional electric current). Significant disadvantages of TLD badges are that the signal of the device is erased or zeroed out during reading, the dosimeters must be returned to a processing laboratory for reading, and substantial time is required to obtain the reading.

Optically Stimulated Luminescence (OSL) badges use an optically stimulated luminescent material (OSLM) (e.g., aluminum oxide) to retain radiation energy. Tiny crystal traps within the OSL material trap and store energy from radiation exposure. The amount of exposure is determined by illuminating the crystal traps with a stimulating light of one color (e.g., green) and measuring the amount of emitted light of another color (e.g., blue). Alternatively, pulsed light stimulation can be used to differentiate between the stimulation and emission light, as describe for example in U.S. Pat. Nos. 5,892,234 and 5,962,857, which are incorporated herein by reference in their entireties. Unlike TLD systems, OSL systems provide a readout in only a few seconds and, because only a very small fraction of the exposure signal is depleted during readout, the dosimeters can be readout multiple times. OSL dosimeters can be read in the field using small, field-transportable readers, however, the readers are still too large, slow and expensive to allow individual, real-time readings in the field. In currently-existing OSL dosimetry programs for reporting the dose of record, the dosimeters must be returned to a processing laboratory for readout.

For more information on OSL materials and systems, see, U.S. Pat. No. 5,731,590 to Miller; U.S. Pat. No. 6,846,434 to Akselrod; U.S. Pat. No. 6,198,108 to Schwietzer et al.; U.S. Pat. No. 6,127,685 to Yoder et al.; U.S. patent application Ser. No. 10/768,094 to Akselrod et al.; all of which are hereby incorporated by reference in their entireties. See also, Lars Botter-Jensen et al., *Optically Stimulated Luminescence Dosimetry*, Elsevier, 2003; Klemic, G., Bailey, P., Miller, K., Monetti, M., "External radiation dosimetry in the aftermath of radiological terrorist event," *Rad. Prot. Dosim*, in press; Akslerod, M. S., Kortov, V. S., and Gorelova, E. A., "Preparation and properties of $Al_2O_3$:C," *Radial. Prot. Dosim*. 47, 159-164 (1993); and Akselrod, M. S., Lucas, A. C., Polf, J. C., McKeever, S. W. S., "Optically stimulated luminescence of Al₂O₃:C," *Radiation Measurements*, 29, (3-4), 391-399 (1998), all of which are incorporated by reference in their entireties.

Solid State Sensors use solid-phase materials such as semiconductors to quantify radiation interaction through the collection of charge in the semiconductor media. As the radiation particle travels through the semiconductor media electron-hole pairs are generated along the particle path. The motion of the electron-hole pair in an applied electric field generates the basic electrical signal from the detector. There are two main categories of solid state sensors, active and passive. Active sensors often use a semiconductor that is biased by an externally powered electric field that requires constant power. The active sensors generate electric pulses for each radioactive particle striking the sensor. These pulses must be continuously counted to record the correct radiation dose. A loss of power means no dose is measured. Active solid state sensors are typically made from silicon and other semiconductors. Passive solid state sensors utilize an on-device charged medium that maintains the electric field necessary to separate the electron-hole pairs without drawing external power. Passive solid state dosimeters often use what is called a floating gate where the gate is embedded within the detection medium so it is electronically isolated. The floating gate is charged and provides the electric field for charge separation, for example, see U.S. Pat. No. 6,172,368 to Tarr. The medium above the floating gate is typically an insulator such as silicon oxide however it can also be a sealed gas chamber, for example see U.S. Pat. No. 5,739,541 to Kahilainen. Passive Solid state electronic detectors offer a means of monitoring radiation that are compatible with the present invention.

Electronic dosimeters are battery powered, and typically incorporate a digital display or other visual, audio or vibration alarming capability. These instruments often provide real-time dose rate information to the wearer. For routine occupational radiation settings in the U.S. electronic dosimeters are mostly, but not strictly, used for access control and not for dose of record. A number of cities and states issue electronic dosimeters to HAZMAT teams as part of their emergency response plans. There are presently tens of thousands of electronic dosimeters deployed, for example, for homeland security purposes; however, electronic dosimeters are impractical for widespread use dosimeters due to their high cost.

Quartz or carbon fiber electrets are cylindrical electroscopes where the dose is read by holding it up to the light and viewing the location of the fiber on a scale through an eyepiece at one end, and a manually powered charger is required to zero the dosimeter. The quartz fiber electret is an important element of many state emergency plans. For example, some plans call for emergency responders to be issued a quartz fiber electret along with a card for recording the reading every 30 minutes, as well as a cumulative dosimetry badge or wallet card. While they are specified for use in nuclear power plant emergencies, the NRC does not require that they be NVLAP accredited but, rather, only that they be calibrated periodically.

SUMMARY

According to a first broad aspect, the present invention provides an apparatus comprising:
one or more processors, and
a machine-readable medium for storing instructions thereon which when executed by the one or more processors cause the one or more processors to perform operations comprising the following steps:

(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium.

wherein each radiation field has a radiation source,
wherein step (b) comprises conducting a numerical optimization process comprising the following steps:
  (i) generating an initial solution vector for each radiation field,
  (ii) iteratively updating the initial solution vector for each radiation field until an objective function is minimized to thereby generate an optimal solution vector, and
  (iii) determining a radiation dose value for each radiation field based on the optimal solution vector for the source, wherein the objective function is $$s_j = \sqrt{\sum_{i=1}^{4}\left(\frac{G_{ij} - \overline{G}_j}{\sigma_{ij}\overline{G}_j}\right)^2}$$

where i is the number of detector elements of the dosimeter,
where j is the number of radiation fields.
where $\overline{G}_j$ is are expected values of one or more dose conversion factors for radiation field j,
where $G_{ij}$ is the dose computed for the $i^{th}$ element of the dosimeter and the $j^{th}$ radiation field, and
where $\sigma_{ij}$ is a total uncertainty of a stored response for the $i^{th}$ detector element of the dosimeter and $j^{th}$ radiation field, and
wherein each stored response is one of a plurality of stored responses stored on a second storage medium.

According to a second broad aspect, the present invention provides machine-readable medium having stored thereon sequences of instructions, which when executed by one or more processors, cause one or more electronic devices to perform a set of operations comprising the following steps:

(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium, wherein each radiation field has a radiation source,
wherein step (b) comprises conducting a numerical optimization process comprising the following steps:
  (i) generating an initial solution vector for each radiation field,
  (ii) iteratively updating the initial solution vector for each radiation field until an objective function is minimized to thereby generate an optimal solution vector, and (iii) determining a radiation dose value for each radiation field based on the optimal solution vector for the source,
wherein the objective function is $$s_j = \sqrt{\sum_{i=1}^{4} \left( \frac{G_{ij} - \overline{G}_j}{\sigma_{ij}\overline{G}_j} \right)^2}$$

where i is the number of detector elements of the dosimeter,
where j is the number of radiation fields,
where $\overline{G}_j$ is are expected values of one or more dose conversion factors for radiation field j,
where $G_{ij}$ is the dose computed for the $i^{th}$ element of the dosimeter and the $j^{th}$ radiation field, and
where $\sigma_{ij}$ is a total uncertainty of a stored response for the $i^{th}$ detector element of the dosimeter and $j^{th}$ radiation field, and
wherein each stored response is one of a plurality of stored responses stored on a second storage medium.

According to a third broad aspect, the present invention provides a method comprising:
(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium,
wherein each radiation field has a radiation source,
wherein step (b) comprises conducting a numerical optimization process comprising the following steps:
(i) generating an initial solution vector for each radiation field,
(ii) iteratively updating the initial solution vector for each radiation field until an objective function is minimized to thereby generate an optimal solution vector, and
(iii) determining a radiation dose value for each radiation field based on the optimal solution vector for the source,
wherein the objective function is $$s_j = \sqrt{\sum_{i=1}^{4} \left( \frac{G_{ij} - \overline{G}_j}{\sigma_{ij}\overline{G}_j} \right)^2}$$

where i is the number of detector elements of the dosimeter,
where j is the number of radiation fields,
where $\overline{G}_j$ is are expected values of one or more dose conversion factors for radiation field j,
where $G_{ij}$ is the dose computed for the $i^{th}$ element of the dosimeter and the $j^{th}$ radiation field, and
where $\sigma_{ij}$ is a total uncertainty of a stored response for the $i^{th}$ detector element of the dosimeter and $j^{th}$ radiation field, and
wherein each stored response is one of a plurality of stored responses stored on a second storage medium.

According to a fourth broad aspect, the present invention provides an apparatus comprising:
one or more processors, and
a machine-readable medium for storing instructions thereon which when executed by the one or more processors cause the one or more processors to perform operations comprising the following steps:
(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium.
wherein each radiation field has a radiation source,
wherein step (b) comprises conducting a numerical optimization process comprising the following steps:
(i) generating an initial solution vector for each radiation field,
(ii) iteratively updating the initial solution vector for each radiation field until an objective function is minimized to thereby generate an optimal solution vector, and
(iii) determining a radiation dose value for each radiation field based on the optimal solution vector for the source,
wherein the objective function is $$\min = \sum_i (cv_i^{MEAS} - cv_i^{SOLUTION})^2$$

where min is the minimized objective function,
where i is the number of detector elements of the dosimeter,
where j is the number of radiation fields,
where $cv_i^{MEAS}$ is a normalized measured converted value for the $i^{th}$ detector element of the dosimeter, and
where $cv_i^{SOLUTION}$ is the response for the $i^{th}$ detector element of the dosimeter for an algorithm solution field, and
wherein each stored response is one of a plurality of stored responses stored on a second storage medium.

According to a fifth broad aspect, the present invention provides machine-readable medium having stored thereon sequences of instructions, which when executed by one or more processors, cause one or more electronic devices to perform a set of operations comprising the following steps:
(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium,
wherein each radiation field has a radiation source,
wherein step (b) comprises conducting a numerical optimization process comprising the following steps:
(i) generating an initial solution vector for each radiation field, (ii) iteratively updating the initial solution vector for each radiation field until an objective function is minimized to thereby generate an optimal solution vector, and (iii) determining a radiation dose value for each radiation field based on the optimal solution vector for the source, wherein the objective function is $$\min = \sum_i (cv_i^{MEAS} - cv_i^{SOLUTION})^2$$

where min is the minimized objective function,
where i is the number of detector elements of the dosimeter,
where j is the number of radiation fields,
where $cv_i^{MEAS}$ is a normalized measured converted value for the $i^{th}$ detector element of the dosimeter, and
where $cv_i^{SOLUTION}$ is the response for the $i^{th}$ detector element of the dosimeter for an algorithm solution field, and wherein each stored response is one of a plurality of stored responses stored on a second storage medium.

According to a sixth broad aspect, the present invention provides a method comprising:

(a) determining radiation dose values for a response matrix by determining a radiation dose value for each radiation field in a response matrix from a plurality of detector elements of a dosimeter, (b) determining a final net radiation dose value for each radiation field in the response matrix, and (c) displaying the final net radiation dose value for each radiation field in the response matrix to a user and/or saving the final net radiation dose value for each radiation field to a first storage medium, wherein each radiation field has a radiation source, wherein step (b) comprises conducting a numerical optimization process comprising the following steps:

(i) generating an initial solution vector for each radiation field, (ii) iteratively updating the initial solution vector for each radiation field until an objective function is minimized to thereby generate an optimal solution vector, and (iii) determining a radiation dose value for each radiation field based on the optimal solution vector for the source, wherein the objective function is $$\min = \sum_i (cv_i^{MEAS} - cv_i^{SOLUTION})^2$$

where min is the minimized objective function,
where i is the number of detector elements of the dosimeter,
where j is the number of radiation fields,
where $cv_i^{MEAS}$ is a normalized measured converted value for the $i^{th}$ detector element of the dosimeter, and
where $cv_i^{SOLUTION}$ is the response for the $i^{th}$ detector element of the dosimeter for an algorithm solution field, and wherein each stored response is one of a plurality of stored responses stored on a second storage medium.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Definitions

Figure 1:
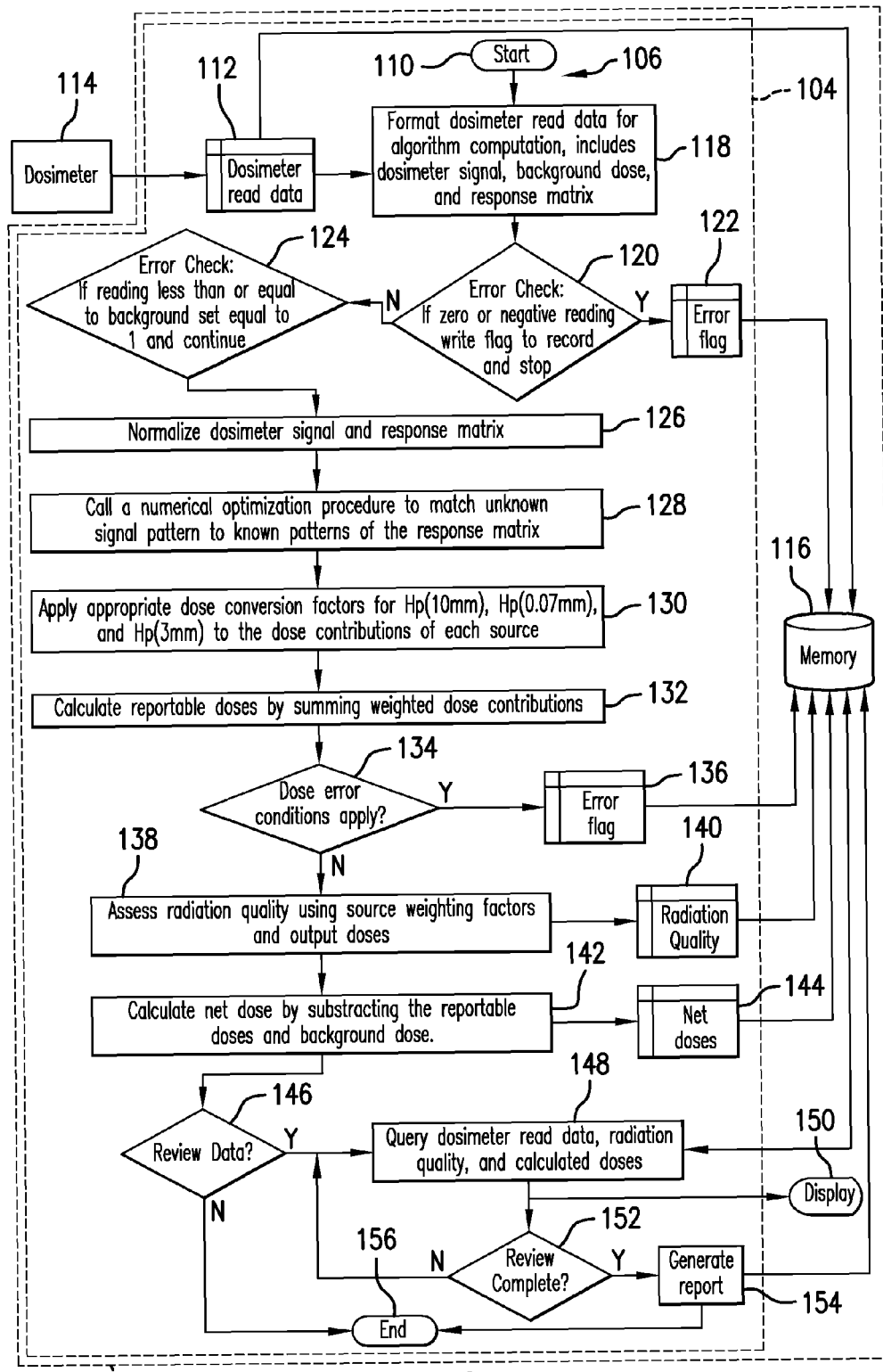
FIG. 1 illustrates in schematic form a device and computational process according to an exemplary embodiment of the present invention.

Where the definition of terms departs from the commonly used meaning of the term, applicant intends to utilize the definitions provided below, unless specifically indicated.

For purposes of the present invention, directional terms such as "top", "bottom", "upper", "lower", "above", "below", "left", "right", "horizontal", "vertical", "upward", "downward", etc., are merely used for convenience in describing the various embodiments of the present invention.

For purposes of the present invention, a value or property is "based" on a particular value, property, the satisfaction of a condition or other factor if that value is derived by performing a mathematical calculation or logical decision using that value, property or other factor.

For purposes of the present invention, the term "accelerometer" refers to any electromechanical device for measuring acceleration forces including static or dynamic forces. Such accelerations are popularly measured in terms of g-force. Single- and multi-axis models of accelerometer are available to detect magnitude and direction of the proper acceleration (or g-force), as a vector quantity, and can be used to sense orientation (because direction of weight changes), coordinate acceleration (so long as it produces g-force or a change in g-force), vibration, shock, and falling in a resistive medium (a case where the proper acceleration changes, since it starts at zero, then increases). MEMS-scale accelerometers are increasingly present in portable electronic devices and video game controllers, to detect the position of the device or provide for game input. Pairs of accelerometers extended over a region of space can be used to detect differences (gradients) in the proper accelerations of frames of references associated with those points. These devices are called gravity gradiometers, as they measure gradients in the gravitational field.

For the purposes of the present invention, the term "Bluetooth®" refers to a wireless technology standard for exchanging data over short distances (using short-wavelength radio transmissions in the ISM band from 2400-2480 MHz) from fixed and mobile devices, creating personal area networks (PANs) with high levels of security. Created by telecom vendor Ericsson in 1994, it was originally conceived as a wireless alternative to RS-232 data cables. It can connect several devices, overcoming problems of synchronization. Bluetooth® is managed by the Bluetooth® Special Interest Group, which has more than 18,000 member companies in the areas of telecommunication, computing, networking, and consumer electronics. Bluetooth® was standardized as IEEE 802.15.1, but the standard is no longer maintained. The SIG oversees the development of the specification, manages the qualification program, and protects the trademarks. To be marketed as a Bluetooth® device, it must be qualified to standards defined by the SIG. A network of patents are required to implement the technology and are licensed only for those qualifying devices.

For purposes of the present invention, the term "chemical sensor" refers to a device that measures the presence, concentration or absolute quantity of a given chemical entity, such as an element or molecule, in either a gas, liquid or solid phase.

For purposes of the present invention, the term "computer" refers to any type of computer or other device that implements software including an individual computer such as a personal computer, laptop computer, tablet computer, mainframe computer, mini-computer, etc. A computer also refers to electronic devices such as an electronic scientific instrument such as a server, spectrometer, a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc. Various processes of the present invention may be carried out using a computer. Various functions of the present invention may be performed by one or more computers.

For purposes of the present invention, the term "computer hardware" refers to the digital circuitry and physical devices of a computer system, as opposed to computer software, which is stored on a hardware device such as a hard disk.

For purposes of the present invention, the term "computer network" refers to a group of interconnected computers. All networks are made up of basic hardware building blocks to interconnect network nodes, such as Network Interface Cards (NICs), Bridges, Hubs, Switches, and Routers. In addition, some method of connecting these building blocks is required, usually in the form of galvanic cable, optical cable ("optical fiber"), microwave links or other radiofrequency transmissions ("wireless" network communications).

For purposes of the present invention, the term "computer software" refers to a general term used to describe a collection of computer programs, procedures and documentation that perform some tasks on a computer system. The term includes application software such as word processors which perform productive tasks for users, system software such as operating systems, which interface with hardware to provide the necessary services for application software, and middleware which controls and co-ordinates distributed systems. Computer software is so called to distinguish it from computer hardware, which encompasses the physical interconnections and devices required to store and execute (or run) the software. At the lowest level, software consists of a machine language specific to an individual processor. A machine language consists of groups of binary values signifying processor instructions which change the state of the computer from its preceding state.

For purposes of the present invention, the term "computer system" refers to any type of computational system in which computer software executes on computer hardware such as a supercomputer, mainframe computer, mini-computer, personal computer, embedded computer or other computational device. In addition, computer system refers to any type of network of such computational systems.

For purposes of the present invention, the term "data" refers to a reinterpretable representation of information in a formalized manner suitable for communication, interpretation, or processing. Although one type of common type data is a computer file, data may also be streaming data, a web service, etc. The term "data" is used to refer to one or more pieces of data.

For purposes of the present invention, the term "database management system (DBMS)" refers to computer software designed for the purpose of managing databases based on a variety of data models. A DBMS is a set of software programs that controls the organization, storage, management, and retrieval of data in a database. A DBMS is categorized according to its data structures or types. It is a set of prewritten programs that are used to store, update and retrieve a Database.

For purposes of the present invention, the term "database" and the term "data record" refer to a structured collection of records or data that is stored in a computer system. The structure is achieved by organizing the data according to a database model. The model in most common use today is the relational model. Other models such as the hierarchical model and the network model use a more explicit representation of relationships (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For purposes of the present invention, the term "detector element" refers to device of a dosimeter that is used to detect a particular radiation field.

For purposes of the present invention, the term "dose conversion factor" refers to a quantity to convert between the absorbed dose in air and the personal dose equivalent, as determined by a reference laboratory.

For purposes of the present invention, the term "dosimeter" refers to a device for measuring an individual's or an object's exposure to radiation—particularly to a radiation source that may inflict cumulative impact over long periods of time, or over a lifetime. This invention concentrates on the radiation dosimeter, which measures exposure to ionizing radiation. The radiation dosimeter is of fundamental importance in the disciplines of radiation dosimetry and health physics. Other types of dosimeters are sound dosimeters, ultraviolet dosimeters and electromagnetic field dosimeters. Ionizing radiation, such as X-rays, alpha rays, beta rays, and gamma rays, are undetectable by the human senses, therefore a measuring device, such as a dosimeter, is used to detect, measure and record this, and in some cases give an alarm when a preset level is exceeded. Ionizing radiation damage to the body is cumulative, and is related to the total dose received, for which the SI unit is the Sievert. Therefore, workers exposed to radiation, such as radiographers, nuclear power plant workers, doctors using radiotherapy, those in laboratories using radionuclides, and some HAZMAT teams are required to wear dosimeters so their employers can keep a record of their exposure to verify that it is below legally prescribed limits. Such devices may be recognized as "legal dosimeters," meaning that they have been approved for use in recording personnel dose for regulatory purposes.

For purposes of the present invention, the term "energy compensating material" refers to any radiation attenuating material that when placed between an ionizing radiation sensor and a source alters the response over a range of gamma energies or x-ray energies compared to the ionizing radiation sensor exposed with no compensating or filtering material. Examples of energy compensating materials are plastic, aluminum, copper, tin, tungsten, etc.

For purposes of the present invention, the term "error condition" refers to a result or decision in the dose calculation process that is anomalous or indicative of a malfunction in the dose calculation process, and therefore is unexpected and requires additional analysis.

For purposes of the present invention, the term "expected dose from a radiation field" refers to the experimentally-determined response of the detector to a reference radiation field.

For purposes of the present invention, the term "hardware and/or software" refers to functions that may be performed by digital software, digital hardware, or a combination of both digital hardware and digital software. Various features of the present invention may be performed by hardware and/or software.

For purposes of the present invention, the term "ionizing radiation" refers to radiation of sufficiently high energy to cause ionization in the medium through which it passes. It may consist of a stream of high-energy particles (e.g. electrons, protons, alpha-particles) or short-wavelength electromagnetic radiation (ultraviolet, X-rays, gamma-rays). This type of radiation can cause damage to the molecular structure of a substance either as a result of the direct transfer of energy to its atoms or molecules or as a result of the secondary electrons or particles released by ionization. The present invention may be used to determine doses of both directly ionizing radiation and indirectly ionizing radiation. When ionizing radiation is emitted by or absorbed by an atom, it can liberate an atomic particle (typically an electron, proton, or neutron, but sometimes an entire nucleus) from the atom. Such an event can alter chemical bonds and produce ions, usually in ion-pairs, that are especially chemically reactive. This greatly magnifies the chemical and biological damage per unit energy of radiation because chemical bonds will be broken in this process. It has many practical uses in medicine, research, construction, and other areas, but presents a health hazard if used improperly. Exposure to ionizing radiation causes damage to living tissue, and can result in mutation, radiation sickness, cancer, and death.

For purposes of the present invention, the term "ionizing radiation sensor" refers to a device that measures the presence or activity of a material or substance that emits or generates ionizing radiation.

For purposes of the present invention, the term "irradiation" refers to the conventional meaning of the term "irradiation", i.e., exposure to high energy particles such as electrons, protons, alpha particles, neutrons etc., or electromagnetic radiation of wave-lengths shorter than those of visible light, e.g. gamma rays, x-rays, or ultraviolet light.

For purposes of the present invention, the term "laboratory-based dosimetry system" refers to a radiation dosimeter analytical system which requires the use of a centrally located analytical laboratory for the dis-assembly, processing and analysis of one or more components of the dosimeter.

For the purposes of the current invention, the term "low powered wireless network" refers to an ultra-low powered wireless network between sensor nodes and a centralized device. The ultra-low power is needed by devices that need to operate for extended periods of time from small batteries energy scavenging technology. Examples of low powered wireless networks are ANT, ANT+, Bluetooth Low Energy (BLE), ZigBee and Wi-Fi.

For purposes of the present invention, the term "machine-readable medium" refers to any tangible or non-transitory medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" includes, but is limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks. The term "machine-readable medium" may include a single medium or multiple media (e.g., a centralized or distributed database, and/or associated caches and servers) that store the one or more instructions or data structures.

For purposes of the present invention, the term "MEMS" refers to Micro-Electro-Mechanical Systems. MEMS, is a technology that in its most general form may be defined as miniaturized mechanical and electro-mechanical elements (i.e., devices and structures) that are made using the techniques of micro-fabrication. The critical physical dimensions of MEMS devices can vary from well below one micron on the lower end of the dimensional spectrum, all the way to several millimeters. Likewise, the types of MEMS devices can vary from relatively simple structures having no moving elements, to extremely complex electromechanical systems with multiple moving elements under the control of integrated microelectronics. A main criterion of MEMS may include that there are at least some elements having some sort of mechanical functionality whether or not these elements can move. The term used to define MEMS varies in different parts of the world. In the United States they are predominantly called MEMS, while in some other parts of the world they are called "Microsystems Technology" or "micromachined devices." While the functional elements of MEMS are miniaturized structures, sensors, actuators, and microelectronics, most notable elements may include microsensors and microactuators. Microsensors and microactuators may be appropriately categorized as "transducers," which are defined as devices that convert energy from one form to another. In the case of microsensors, the device typically converts a measured mechanical signal into an electrical signal.

For purposes of the present invention, the term "optimized data-fitting procedure" refers to a transformation of the parameters of a mathematical model to predict the output response for a known set of input data. The procedure is optimal in the sense that it minimizes the errors between the known input data and predicted output response.

For purposes of the present invention, the term "processor" refers to a device that performs the basic operations in a computer. A microprocessor is one example of a processor.

For purposes of the present invention, the term "radiation attenuating material" refers to a material that reduces the intensity of incident radiation by absorbing some or all of the energy of the radiation within the material.

For purposes of the present invention, the term "personal dose equivalent" refers to the dose at a specified depth in biological tissue for a specified radiation field. In one embodiment of the present invention, the personal dose equivalent refers to $H_p(10\ mm)$, $H_p(0.07\ mm)$, and $H_p(3\ mm)$.

For purposes of the present invention, the term "radiation dosimetry" refers to the conventional meaning of the term "radiation dosimetry", i.e., the measurement of the amount of radiation dose absorbed in a material, an object or the body of an individual.

For purposes of the present invention, the term "radiation sensing material" refers to a material used to sense radiation in a radiation sensor. Examples of radiation sensitive materials including optically stimulated luminescent materials for OSL sensors, thermoluminescent materials for thermoluminescent dosimetry (TLD) sensors, etc.

For purposes of the present invention, the term "real-time processing" refers to a processing system designed to handle workloads whose state is constantly changing. Real-time processing means that a transaction is processed fast enough for the result to come back and be acted on as transaction events are generated. In the context of a database, real-time databases are databases that are capable of yielding reliable responses in real-time.

For purposes of the present invention, the term "source" and the term "radiation source" are used interchangeably to refer to a radiation source such as x-rays, gamma rays, alpha particles, beta particles and neutrons. Each radiation source has one or more associated radiation fields.

For purposes of the present invention, the term "sensor" refers to a collector and/or producer of information and/or data. A sensor can be an instrument or a living organism (e.g. a person). For example, a sensor may be a GPS device, a thermometer, a mobile phone, an individual writing a report, etc. A sensor is an entity capable of observing a phenomenon and returning an observed value. For example, a mercury thermometer converts the measured temperature into expansion and contraction of a liquid which can be read on a calibrated glass tube. A thermocouple converts temperature to an output voltage which can be read by a voltmeter. For accuracy, all sensors are often be calibrated against known standards. A sensor may include a device which detects or measures a physical property and records, indicates, or responds to that physical property.

For purposes of the present invention, the term "solid state sensor" refers to sensor built entirely from a solid-phase material such that the electrons or other charge carriers produced in response to the measured quantity stay entirely with the solid volume of the detector, as opposed to gas-discharge or electro-mechanical sensors. Pure solid-state sensors have no mobile parts and are distinct from electro-mechanical transducers or actuators in which mechanical motion is created proportional to the measured quantity.

For purposes of the present invention, the term "solid-state electronics" refers to those circuits or devices built entirely from solid materials and in which the electrons, or other charge carriers, are confined entirely within the solid material. The term is often used to contrast with the earlier technologies of vacuum and gas-discharge tube devices and it is also conventional to exclude electro-mechanical devices (relays, switches, hard drives and other devices with moving parts) from the term solid state. While solid-state can include crystalline, polycrystalline and amorphous solids and refer to electrical conductors, insulators and semiconductors, the building material is most often a crystalline semiconductor. Common solid-state devices include transistors, microprocessor chips, and RAM. A specialized type of RAM called flash RAM is used in flash drives and more recently, solid state drives to replace mechanically rotating magnetic disc hard drives. More recently, the integrated circuit (IC), the light-emitting diode (LED), and the liquid-crystal display (LCD) have evolved as further examples of solid-state devices. In a solid-state component, the current is confined to solid elements and compounds engineered specifically to switch and amplify it.

For purposes of the present invention, the term "storage medium" or "storage device" refers to any tangible medium or media on which a data and/or instructions may be stored for use by a computer system. Examples of data storage media include floppy disks, CD-ROM, CD-R, CD-RW, DVD, DVD-R, memory sticks, flash memory, hard disks, solid state disks, optical disks, etc. Two or more data storage media acting similarly to a single data storage medium may be referred to as a "storage medium" for purposes of the present invention.

For purposes of the present invention, the term "stored response" refers to stored responses of a detector element to known radiation fields. The known radiation fields may be from a single pure radiation source and/or a mixture of radiation sources. An uncertainty may be associated with a stored response.

For purposes of the present invention, the term "time" refers to a component of a measuring system used to sequence events, to compare the durations of events and the intervals between them, and to quantify the motions of objects. Time is considered one of the few fundamental quantities and is used to define quantities such as velocity. An operational definition of time, wherein one says that observing a certain number of repetitions of one or another standard cyclical event (such as the passage of a free-swinging pendulum) constitutes one standard unit such as the second, has a high utility value in the conduct of both advanced experiments and everyday affairs of life. Temporal measurement has occupied scientists and technologists, and was a prime motivation in navigation and astronomy. Periodic events and periodic motion have long served as standards for units of time. Examples include the apparent motion of the sun across the sky, the phases of the moon, the swing of a pendulum, and the beat of a heart. Currently, the international unit of time, the second, is defined in terms of radiation emitted by cesium atoms.

For purposes of the present invention, the term "timestamp" refers to a sequence of characters, denoting the date and/or time at which a certain event occurred. This data is usually presented in a consistent format, allowing for easy comparison of two different records and tracking progress over time; the practice of recording timestamps in a consistent manner along with the actual data is called time-stamping. Timestamps are typically used for logging events, in which case each event in a log is marked with a timestamp. In file systems, timestamp may mean the stored date/time of creation or modification of a file. The International Organization for Standardization (ISO) has defined ISO 8601 which standardizes timestamps.

For purposes of the present invention, the term "visual display device" and the term "visual display apparatus" refers to any type of visual display device or apparatus such as a CRT monitor. LCD screen, LEDs, a projected display, a printer for printing out an image such as a picture and/or text, etc. A visual display device may be a part of another device such as a computer monitor, television, projector, telephone, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, microwave oven, electronic organ, automatic teller machine (ATM) etc.

For purposes of the present invention, the term "weighting factor" refers to the contribution of each radiation field to the predicted output response.

For the purposes of the present invention, the term "Zig-Bee" refers a specification for a suite of high level communication protocols used to create personal area networks built from small, low-power digital radios. ZigBee is based on an IEEE 802 standard. Though low-powered, ZigBee devices often transmit data over longer distances by passing data through intermediate devices to reach more distant ones, creating a mesh network; i.e., a network with no centralized control or high-power transmitter/receiver able to reach all of the networked devices. The decentralized nature of such wireless ad-hoc networks make them suitable for applications where a central node can't be relied upon. ZigBee may be used in applications that require a low data rate, long battery life, and secure networking. ZigBee has a defined rate of 250 kbit/s, best suited for periodic or intermittent data or a single signal transmission from a sensor or input device. Applications include wireless light switches, electrical meters with in-home-displays, traffic management systems, and other consumer and industrial equipment that requires short-range wireless transfer of data at relatively low rates. The technology defined by the ZigBee specification is intended to be simpler and less expensive than other WPANs, such as Bluetooth® or Wi-Fi. Zigbee networks are secured by 128 bit encryption keys.

DESCRIPTION

In existing passive, integrating radiation monitoring devices, such as film, TLD or OSL sensors, incident radiation is accumulated and stored within the crystalline structure of the sensor without any need of electrical power. This characteristic makes passive sensors ideal for situations where the risk of a power interruption is unacceptable. Multiple radiation sensors are generally mounted in a holder containing one or more filters that alter the amounts, energies and types of radiation able to reach the sensors. These filters typically sandwich the sensors to achieve correct assessments when the radiation enters the dosimeter from various angles of incidence. To analyze the sensors, they must be removed from between the filters and the holder and physically presented to the processing system required to elicit the quantitative attribute exhibited by the sensor following exposure to radiation.

Radiation dosimeters based on optically stimulated luminescence (OSL) utilize an optical path whereby a stimulating beam of light can illuminate the OSL sensor(s) and the resultant radiation induced luminescence can be routed back through the same or alternate optical path to a light detector such as a photomultiplier tube that quantifies the amount of luminescent light.

The personal dose equivalent, measured using a radiation dosimeter, is the most commonly used metric of radiation dose to an individual. The accurate and reliable measurement of the personal dose equivalent is a key component of radiation dosimetry. The personal dose equivalent is typically measured over a wide range of energies and from different radiation sources, which might include x-rays, gamma rays, alpha particles, beta particles and neutrons. In order to accurately estimate the dose from different radiation sources, many personal dosimeters incorporate an array of detector elements, each with varying types of radiation filtration materials, and use a dose calculation algorithm to accurately calculate the personal dose equivalent from a numerical combination of the responses from each detector element.

In one embodiment, the present invention provides a small, low-cost, self-contained and field-readable radiation dosimeters that provide an accurate calculation of the Personal Dose Equivalent over a wide dose range, wide energy range, and over large angles of incidence.

In one embodiment, the present invention provides a procedure for the calculation of the appropriate absorbed radiation dose values from a detector system consisting of multiple sensor devices, which may include, for example, two or more integrating ionizing radiation sensors, a MEMS-scale accelerometer, a geospatial positioning sensor (e.g., GPS), a thermistor, an energy harvester, or chemical, biological, ultraviolet (UV) or electromagnetic frequency (EMF) sensors.

In one embodiment, the present invention comprising reading the measurements from the sensors from an instrument or a storage medium, the transformation of the raw input sensor data into the required dose information, and the transmission and storage of the resultant outputs for use in occupational and environmental dosimetry. In one embodiment, the present invention provides a method that uses accurate data fitting optimization for dose calculations matched to specific applications, is easy to update without modification to the underlying software program, computable on embedded firmware, and compatible with any dosimetry system that requires the analysis of two or more sensor elements, including passive and active dosimeters, and including both field-readable, mobile dosimeters as well as laboratory-based dosimetry systems.

Radiation attenuating materials are used to modify the response of non-tissue equivalent radiation sensors to allow varying responses to a wide range of radiation qualities. The modified response can then be used by an algorithm to derive the tissue equivalent dose. The use of multiple attenuating materials around multiple sensors with the use of a software algorithm will allow increased levels of fine discrimination between types of ionizing radiation and radiation energy.

Additional advantages of the described embodiments of multiple sensor output using time, motion, location and orientation of the dosimeter at the point of exposure further enables the determination of when the exposure occurred, where the exposure occurred, and whether the dosimeter was being worn (and worn correctly) during an exposure event. Knowledge of whether the dosimeter was being worn correctly at the time of exposure is critical to characterizing the nature of the exposure, the validity of the calculated dose, and any potential risk to the participant. Furthermore, knowledge of the point of exposure in time is critical to reconstructing the events preceding the exposure and can aid in characterizing the duration, source and nature of the exposure. Ready access to this information is an important component of radiation safety and radiation dosimetry programs. Orientation-sensing enables the correction of the dose calculation based upon the incident angle and source orientation. Temperature-sensing enables the correction of the dose calculation for temperature-based variations.

The accurate and reliable measurement of a personal dose equivalent is a key component of radiation dosimetry programs. The personal dose equivalent is typically measured over a wide range of energies and from different radiation sources, including, for example, x-ray and gamma photons, beta particles and neutrons. In order to accurately estimate the dose from different radiation sources, personal dosimeters incorporate multiple detector elements, each with varying types of radiation filtration materials, and use a dose calculation algorithm, to calculate the personal dose equivalent from a numerical combination of the responses from each detector element.

One approach to calculate the dose is to use a simple linear combination of detector element responses. Such approaches are straight-forward and easy to implement, but may be highly sensitive to noise and often do not reliably provide an accurate estimate of the dose under realistic conditions. Another approach is to use empirically-determined branching and decision points. According to exemplary embodiments of the present invention, this approach is relatively easy to implement, and improves performance under some conditions, but the empirical decisions are unique to specific conditions, and often subject to systematic biases. Techniques for applying both linear combination and branching methods to radiation dosimetry have been developed, for example, by N. Stanford (e.g., see N. Stanford, Whole Body Dose Algorithm for the Landauer InLight Next Generation Dosimeter, Algorithm Revision: Next Gen IEC; Sep. 13, 2010 and N. Stanford, Whole Body Dose Algorithm for the Landauer InLight Next Generation Dosimeter, Algorithm Revision: Next Gen NVLAP; Sep. 27, 2010 and N. Stanford, "Linear vs. Functional-Based Dose Algorithm Designs." *Rad. Prot. Dosim.,* 144 (1-4), 253-256 (2011).

In one embodiment, the present invention provides a computational procedure to automatically generate a dose calculation algorithm that is numerically optimized for a particular dosimeter type (i.e., a particular combination of dosimeter detector elements, filter and other sensor elements). In order to minimize systematic bias, the computational procedure of the disclosed embodiment calculates a weighted average from representative data, such that the resultant dose is not entirely dependent upon a given radiation field, detector or ratio of detector signals. The following describes the computational procedure used to generate a numerically-optimized dose calculation algorithm for a personal dosimeter using a matrix of element responses obtained from measurements of that type of dosimeter.

Given a personal dosimeter consisting, for example, of multiple filtered detector elements or sensors, the detected signal from each detector element is called the element response, and the array of element responses from a given dosimeter is called the detector's element response pattern. For a given type of dosimeter, the matrix resulting from multiple detector element responses at different but known irradiations is called the element "response matrix" or simply, the "response matrix".

The response matrix is created by exposing a dosimeter to known irradiations at different angles and to mixtures of individual or multiple sources, and then reading the element responses from each detector element. The element response pattern from an unknown irradiated dosimeter is then compared to the patterns in the element response matrix, and a dose is calculated for each radiation field in the response matrix. The final reported dose is the sum of all the individual source doses weighted by a Source Probability Factor. The Source Probability Factor is a measure of how closely the element response pattern of the unknown dosimeter matches the individual element response pattern of known sources.

FIG. 1 shows a computer 102 including a processor 104 for implementing a process 106 to generate numerically optimized radiation dose calculations for personal dosimeters according to one embodiment of the present invention. When process 106 is started at step 110, raw data 112, consisting of measured dosimeter signal, background dose information, and response matrix is read from dosimeter 114. Raw data 112 is then saved to a storage medium, i.e., memory 116 (which may be, for example, be a computer memory or hard drive) of computer 102 and formatted for processing at step 118. Alternatively, prior to process 106 starting, raw data 112 that has been previously saved to memory 116 may be formatted for further processing at step 118. The term "formatted for processing" in this context refers to transferring data from computer memory or disk and inserting it into a data structure that contains the values for the dosimeter signal, background dose, and response matrix.

The reading of raw data 112 from dosimeter 114 may be via an offline (external) reader or via real-time wired or wireless communication between dosimeter 114 and computer 102. This may be performed in a number of ways including: by using an external Reader to record the dosimeter signals from each of multiple detector elements, or by electronically connecting computer 102 to dosimeter 114; by means of wireless communication between dosimeter 114 and computer 102; or by saving raw data 112 to an external storage device, such as a memory stick, inserted in dosimeter 114 and inserting the storage device containing the saved raw data into computer 102. For dosimeters employing optically simulated luminescence (OSL), for example, such as LANDAUER's InLight® dosimeters, the dosimeter element responses correspond to the counts from the photomultiplier tube (PMT) in the InLight® Reader.

Memory 116, which is a machine-readable medium, has stored thereon sequences of instructions, which when executed, processor 104, because one or more electronic devices to perform process 106. Process 106 processes raw data 112 (e.g., dosimeter readout, background dose, and response matrix) and transforms raw data 112 to useful information that may be further written to memory 116 so that the information may be displayed as needed to a user as needed.

At step 120 error conditions are checked by computer 102 and, if detected, an error 122 is flagged at step 120 and all errors may be tracked/tabulated on memory 116. If there is no error at step 124, raw data 112 read from dosimeter 114 is processed by computer 102 at step 126 to normalize the dosimeter signal and response matrix of raw data 112. At step 128 a numerical optimization procedure is called by computer 102 to match each unknown signal pattern of the raw data to known signal patterns of the response matrix. At step 130, computer 102 applies appropriate dose conversion factors to the dose contributions of raw data 112 for each radiation field. At step 132, reportable doses are calculated by computer 102 by summing up weighted dose contributions for each radiation field output dose. Radiation quality is assessed in step 138 by performing a sum over the weighting factors multiplied by the source energy and particle identification At step 134 error conditions are checked by computer 102 and, if detected, an error 136 is flagged at step 134 and all errors may be tracked/tabulated on memory on memory 116. If no error is detected, at step 138 radiation quality is assessed by computer 102 using source weighting factors and output doses. Based on the results of step 138, radiation quality information 140 is saved on memory 116. At step 142 net doses 144 are calculated by computer 102 by subtracting the reportable doses and background dose. Calculated net doses 144 are the saved by computer 102 to memory 116. At step 146a determination is made by computer 102 as to whether data stored on memory 116 needs to be reviewed. The calculated dose data may need to be reviewed if one or more error conditions occurs. If it is determined by computer 102 at step 146 that data stored on the storage medium needs to be reviewed, a query is made of the raw data read, the data for radiation quality and the data for calculated doses stored on memory 116 and the results are displayed to a user on a visual display device 150. If the review of the data is determined by computer 102 to be complete at step 152, then a report is generated at step 154 by computer 102. After the report is generated at step 154, process 106 ends at step 156 If the review of data is not complete, then step 148 is conducted computer 102 for a new query. The review of the data might not be complete if the originating Error Condition cannot be resolved, in which case the dose is marked as invalid. If it is determined at step 146 that the data does not need to be reviewed, the process 106 ends at 156.

Although for simplicity, a single processor is shown in FIG. 1, the processor of the present invention may comprise one or more processors.

In one embodiment of the present invention, in step 118 the dosimeter element responses and the corresponding dosimeter response matrix for that type of dosimeter are input, and then the converted values are calculated. For dosimeters employing optically simulated luminescence (OSL), for example, such as LANDAUER's InLight® dosimeters, the dosimeter element responses correspond to the counts from the photomultiplier tube (PMT) in the InLight® Reader. The converted values are calculated from the PMT counts as shown in Equation 1 below:

$$ConvertedValue_i = \frac{PMT\ Counts_i}{Sensitivity \times Reader\_Cal\_Factor} \quad (1)$$

In one embodiment of the present invention, the normalization process of step 126 involves applying a mathematical algorithm using prescribed numerical procedures to optimize the response matrix. This may include calculating the expected source dose with an optimized data-fitting procedure. The inputs are the converted values, sensor outputs and source responses. The response matrix weighting factor may be calculated using a goodness-of-fit statistic. The weighting factors indicate how much each radiation field contributes to the final net dose.

In one embodiment of the present invention, step 126 employs a chi-squared minimizer goodness-of-fit statistic to calculate the response matrix weighting factors, which is computationally efficient but, if there are multiple local minima, then it might not converge to the globally optimum solution. A number of heuristic search algorithms have been developed to automatically find the global optimum. These include simulated annealing, tabulating, search, and genetic algorithms. Genetic Algorithms have been shown to overcome many of the limitations of conventional minimizers in complex numerical optimization problems (see Yuan Xu; Scott Neu; Chester J. Ornes; Janis F. Owens; Jack Sklansky; Daniel J. Valentino; Optimization of active-contour model parameters using genetic algorithms: segmentation of breast lesions in mammograms. Proc. SPIE 4684, Medical Imaging 2002: Image Processing, 1406, May 15, 2002; doi:10.1117/12.467106). Each computational technique has inherent advantages and limitations. The design of the algorithm can be adapted to include any of the commonly used optimization techniques without adversely affecting the algorithm performance.

In one embodiment of the present invention, in step 128 the response matrix selection may be based on empirically derived rules. For example, in order to achieve optimal performance for a specific application, the range of sources in the response matrix can be restricted based upon empirically-derived decision points.

In one embodiment of the present invention, in which raw data is read from LANDAUER InLight® dosimeters, the response matrix contains entries (variables) describing the source, the individual element responses, the $H_p(0.07\ mm)$ or shallow dose equivalent (SDE) conversion factor, the $H_p(10\ mm)$ or deep dose equivalent (DDE) conversion factor, the $H_p(3\ mm)$ or lens-of-eye dose equivalent (LDE) conversion factor, radiation type, radiation energy and the standard deviations of the responses. In this embodiment of the present invention, at step 130, computer 102 applies the appropriate dose conversion factors to the dose contributions of raw data 112 of each radiation field measured by dosimeter 114. For this embodiment of the present invention, the appropriate dose contribution may be calculated from the product of the weighting factor, expected source doses, and dose conversion factor for personal dose equivalent, e.g., $H_p(10\ mm)$, $H_p(0.07\ mm)$, and $H_p(3\ mm)$, respectively.

In one embodiment of the present invention, the steps 132, 138 and 142 may be performed in the following way by computer 102. Based on a set of measured converted values, the individual doses (G1-G4) for each radiation field are calculated at step 132. At step 138, each of these individual doses given a weighted value based on a fit parameter. At step 142, the weighted values of the individual doses are summed to obtain the average calculated dose. The values of G1-G4 for a given radiation field indicate what the $H_p(0.07\ mm)$ or shallow dose equivalent (SDE) would be if the given radiation field exactly matched the actual incident field seen by the dosimeter. Converting the element responses to G1-G4 in this manner results in the response matrix and measured converted values having the same scale. In this way, the converted values and response matrix can be compared numerically.

Figure 2:
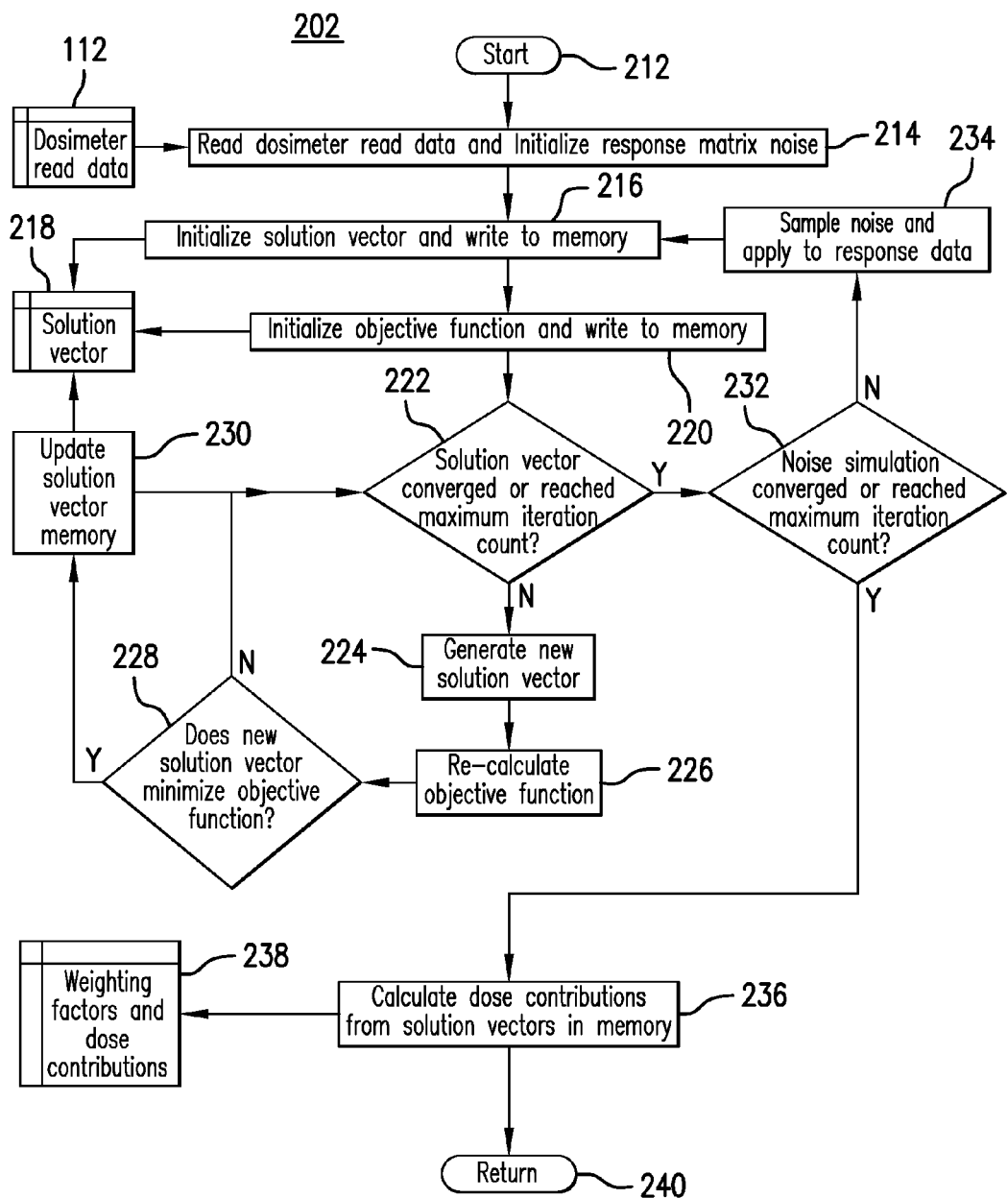
FIG. 2 is a flowchart of a numerical optimization procedure according to one embodiment of the present invention.

FIG. 2 shows greater detail of numerical optimization procedure 202 that is called at step 128 of process 106 and conducted by computer 102. When called at step 128 of process 106, numerical optimization procedure 202 starts at step 212 and reads dosimeter raw data 112 and initiates response matrix noise 214. At step 216a solution vector 218 is initialized and written to storage memory 116 (which may be, for example, a computer memory or a hard drive) for each radiation field. At step 220, an objective function is initialized and is written to memory 116. At step 222, it is determined whether solution vector 218 has converged or the maximum iteration count for numerical optimization procedure 202 has been reached.

If at step 222, it is determined that solution vector 218 has not converged and the maximum iteration count for generating a solution vector has not been reached, at step 224 a new solution vector 218 is generated. Then at step 226, the objective function is recalculated. At step 228, computer 102 determines if the new solution vector minimizes the objective function. If the new solution vector does not minimize the objective function, at step 222 the computer determines if the new solution vector has converged or reached the maximum iteration count. If the new solution vector does minimize the objective function, the solution vector is updated in memory 116 at step 230 and the new solution vector becomes the "optimal solution vector" used to calculate dose contributions.

If at step 222, it is determined that solution vector 218 has converged or the maximum iteration count for generating a solution vector has been reached, at step 232, computer 102 determine whether noise stimulation has converged or reached the maximum iteration count for sampling noise has been reached. If at step 232, computer 102 determines that noise stimulation has not converged and the maximum iteration count has not been reached, at step 234 computer 102 samples noise and applies the noise to the response data. Then at step 216, a solution vector is initialized and written to memory 116 based on the modified response data saved to memory 116 at step 234.

If at step 232, computer 102 determines that noise stimulation has converged or the maximum iteration count has been reached, computer 102 calculates doses from solutions vectors in memory 116 at step 236 to produce weighting factors and doses contributions 238. Then at step 240, numerical optimization procedure 202 ends and the rest of process 106 resumes at step 130.

Specific details of steps of process 106 and numerical optimization procedure 202 according to various embodiments of the present invention are described below.

In process 106, he expected value of the $H_p$(0.07 mm) for a given field could be taken as the simple average of element dose values. This however would be insufficient due to the fact that for some incident radiation fields, several detectors may have signals with high levels of uncertainty. This turns out to be the case with dosimeter response to low energy beta particles (e.g. Krypton-85 beta particles) incident upon detectors with filtration over 0.1 g/cc in density thickness. The radiation induced signal received from the filtered element is too low relative to the measurement noise level to adequately distinguish the radiation signal with a low level of uncertainty.

Therefore, in one embodiment of the present invention, in order to ensure that the radiation dose for an individual, a room, an area, etc. is calculated only using detectors with a good signal is to weight the signal of each detector by a factor inversely proportional to the expected uncertainty and then perform a weighted average over the detectors. The first set is to define the expected uncertainty. Assume that each response matrix entry is determined from data for which the counting statistics were negligible (high dose). This error is a combination of the uncertainties due to the irradiation, reading, handling, and material variability. This combined error is computed as the standard deviation of the data used to generate the response matrix, it is symbolized by $\sigma$.

In one embodiment of the present invention, in step 126 of process 106, the signal for a given detector may be multiplied by zero if the measured converted value for that detector is below a certain level. In this embodiment, detectors that are set to zero are not used in any further calculations, thereby reducing the dimensionality of the dataset and improving computational efficiency.

In one embodiment of the present, the expected values of $H_p$(0.07 mm), $H_p$(10 mm), $H_p$(3 mm) for field j are given by $\overline{G}_j$, see Equation 2 below, are used as dose conversion factors in step 130 of process 106 of FIG. 1. $G_{ij}$ is the dose computed for the $i^{th}$ element of the detector and the $j^{th}$ radiation field. The total uncertainty of the stored responses for the $i^{th}$ detector element and $j^{th}$ radiation field is by symbolized by $\sigma_{ij}$.

$$\overline{G}_j = \frac{\sum_{i=1}^{4} \frac{G_{ij}}{\sigma_{ij}^2}}{\sum_{i=1}^{4} \frac{1}{\sigma_{ij}^2}} \tag{2}$$

In this embodiment of the present invention, the uncertainty of the stored responses is accounted for, and minimizes the effect that measurement noise has on the calculated dose. This is an improvement on conventional dose calculation algorithms that do not directly use uncertainty in dose calculation.

The uncertainty values used by the algorithm for dose computation may be randomly sampled using a probability distribution and the stored uncertainty values in the response matrix: this is known as noise sampling. The dose calculation may be performed several times with different noise samples for a single dosimeter, as shown in steps 232 and 234 of numerical optimization procedure 202. The distribution of doses can thereby be estimated, which can be used to further improve the accuracy of the reported dose.

In one embodiment of the present invention, the objective function used for numerical optimization procedure 202 is similar to a $\chi^2$ goodness of fit statistic and is referred to as the chi-squared optimization process. The chi-Squared optimization objective function for a single radiation field, j, is given in Equation 3.

$$s_j = \sqrt{\sum_{i=1}^{4} \left( \frac{G_{ij} - \overline{G}_j}{\sigma_{ij} \overline{G}_j} \right)^2} \tag{3}$$

In the chi-squared optimization process, a set of weighting factors are used to determine the contribution of each radiation field in the response matrix to the final reportable dose. The weighting factor for field j is calculated using Equation 4 below. The set of weighting factors associated with each radiation field in the response matrix is a solution vector, such as solution vector 218 shown in process 106. The form of the solution vector is given in Equation 5 below.

$$W_j = \frac{1}{(e^{5j} - 1)^2} \tag{4}$$

$$\vec{W} = (W_1, W_2, \ldots, W_j, \ldots, W_N) \tag{5}$$

Once a weighting factor has been calculated for each field in the response matrix, the reported SDE value, $G_{rep}$, is calculated. This is done by taking the weighted sum of the expected values for each radiation field $\overline{G}_j$, over the entire response matrix (see step 132). This is given in Equation 6 below, where the sum is performed over a response matrix of N fields.

$$G_{rep} = \frac{\sum_{j=1}^{N} W_j \overline{G}_j}{\sum_{j=1}^{N} W_j} \tag{6}$$

The quantification of similarity between the response pattern of a measured set of converted values and the fields in the response matrix can be derived using a number of optimization techniques. In one embodiment of the present invention, a function similar to a $\chi^2$ statistic may be used, as illustrated in Equations 3 and 4. The source specific statistical weighting factor is an empirical measure of how well the pattern of a set of measured converted values matches the patterns found in the response matrix.

In one embodiment of the present invention, the solution vector may be defined as the set of weights that minimizes the objective function. An alternative definition of the objective function is given in Equation 7 below. Numerical optimizers will typically follow a routine in which an initial solution vector is generated and iteratively updated until the objective function is minimized. In Equation 7, $cv_i$ are normalized converted values with superscripts representing the measured converted values and stored responses for the $i^{th}$ detector element.

$$\min = \sum_i (cv_i^{MEAS} - cv_i^{SOLUTION})^2 \tag{7}$$

In step 134 of process 106, a check for error conditions is performed. In this step, common error conditions are checked and, if detected, the appropriate error conditions are set. If a serious error condition was detected, then the error condition indicates that the calculated dose was not valid. If no serious errors occur, then the calculated dose is considered valid.

In step 148 of process 106, the most likely source of radiation is estimated. In this step, the probable contribution of each radiation field in the response matrix is calculated. In the current embodiment of the algorithm, the probable contribution of photons and beta particles and their effective energy is estimated. This information is used to assess the type of radiation field (e.g., a pure radiation field or a mixed radiation field) and energy of the radiation. A pure radiation field is radiation arising from a single source (e.g., a single radioactive isotope). A mixed radiation field is radiation arising from different radioactive isotopes.

In step 142, the final (net) dose values are calculated. In this step, the net dose is calculated by subtracting a control dose from the previously calculated dose. Only net doses greater than the minimum detectable dose are reported (the common practice is to report positive dose values. A negative dose indicates that the participant dose was less than the expected background dose, but it is not commonly reported).

In step 154, the net dose values are outputted, e.g., from memory to storage device. In this step, the net dose is assigned to a specific dosimeter using the unique identification value stored in the dosimeter information database. The calculated Net Dose in computer memory is stored in the database (or exported to an external data file if needed. The results can be formatted to allow the generation of dose-of-record customer dose reports as required by local, national or international regulations.

In various embodiments, the present invention provides a computational procedure to generate numerically optimized dose calculation algorithms. The resultant computational procedure dose algorithms provide accurate and reliable measurements of personal dose equivalents, e.g., $H_p(10$ mm$)$, $H_p(3$ mm$)$ and $H_p(0.07$ mm$)$, for personal dosimetry, while avoiding the systematic errors introduced by other techniques. Some advantages of the disclosed computational procedure include the ability to generate a numerically optimized algorithm, the absence of branching or empirical decision points, and fast computation speed. The disclosed computational procedure is also easily optimized for any dosimeter design, regulatory standard, or customer irradiation environment. Accordingly, dosimetry systems using the generated algorithm of the disclosed computational procedure and presently disclosed embodiments have achieved compliance with NVLAP and IEC 62387 requirements.

The devices and subsystems of the disclosed exemplary embodiments can store information relating to various processes described herein. This information can be stored in one or more memories, such as a hard disk, optical disk, magneto-optical disk, RAM, and the like, of the devices and subsystems of the disclosed exemplary embodiments. One or more databases of the devices and subsystems of the present invention may store the information used to implement various processes of the present invention. The databases may be organized using data structures (e.g., records, tables, arrays, fields, graphs, trees, lists, and the like) included in one or more memories or storage devices listed herein. The processes described with respect to the disclosed exemplary embodiments can include appropriate data structures for storing data collected and/or generated by the processes of the devices and subsystems of the disclosed exemplary embodiments in one or more databases thereof.

All or a portion of the devices and subsystems of various embodiments of the present invention may be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the disclosed exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the disclosed exemplary embodiments, for driving the devices and subsystems of the disclosed exemplary embodiments, for enabling the devices and subsystems of the disclosed exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the disclosed exemplary embodiments. Computer code devices of the exemplary embodiments of the present invention can include any suitable interpretable or executable code mechanism, including but not limited to scripts, interpretable programs, dynamic link libraries (DLLs), Java classes and applets, complete executable programs, etc. Moreover, parts of the processing of the exemplary embodiments of the present invention can be distributed for better performance, reliability, cost, and the like.

As stated above, the devices and subsystems of the disclosed exemplary embodiments can include computer readable storage medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

In one embodiment, the present invention expands the capabilities and application of traditional, standalone dosimeters by allowing collected data to be transmitted to a central location for processing and redistribution by a computer, such as described and shown in U.S. patent application Ser. No. 13/906,553 to Valentino et al., entitled WIRELESS, MOTION AND POSITION-SENSING, INTEGRATING RADIATION SENSOR FOR OCCUPATIONAL AND ENVIRONMENTAL DOSIMETRY, filed May 31, 2013, the entire contents and disclosure of which is incorporated herein by reference. In such an embodiment, the dosimeter that is read by the computer may be an integrated sensor module that is integrated into a dosimetry badge. The dosimetry badge may be a package, for example, including the disclosed electronics packaging including the integrated sensor module, batteries and a cover. The integrated sensor module collects radiation data and ultimately transmits the data to a remote location such as a wireless base station or other wireless communications device such as mobile communications device that includes a processor for processing the raw data from the dosimeter. A remote sensor chip of integrated sensor module may be utilized to transmit the data. In this case, the data may be transmitted via a wireless transmission communication protocol such as Bluetooth®, Bluetooth Low Energy (BLE), ZigBee, ANT, ANT+ or other standard Wi-Fi protocol, etc.

The mobile communication device including the processor for processing the raw data may be a smart phone, tablet or a mobile hot-spot, or it might be a non-mobile network device such as a dedicated base station. The mobile communication device may be configured to include a wireless transmitter and receiver, data network interface, and a global positioning system (GPS). The integrated sensor module of the dosimeter may include a wireless system on a chip (SOC) module that is configured to communicate with a wireless transmitter and receiver. The wireless transmitter and receiver may be a low powered wireless network interface for the mobile communication device. The network interface allows the mobile communication device to communicate with an integrated modular wireless sensor chip to download collected data. The aforementioned communication facilitates the determination of whether mobile communication device is in range of integrated sensor module.

The mobile communication device may also be configured to include a data network interface. The data network interface allows the mobile communication device to communicate to another wide area wireless network such as via data network transmission communication protocol. Suitable data network transmission communication protocols include: Wi-Fi, GSM/EDGE, CDMA, UTMS/HSPA+, LTE and other high speed wireless data communication networks. In on embodiment of the present invention, Bluetooth®, may be employed to communicate between a dosimeter or dosimetry badge and the mobile communication device (such as via a wireless transmission communication protocol) for processing raw data from the dosimeter or dosimetry badge, and the use of LTE (Long-Term Evolution) to communicate between a mobile communication device and a wireless network (such as via a data network transmission communication protocol) of a remote facility such as a hospital or laboratory. By communicating, for example, over a public data network, the aforementioned remote facility, such as a hospital or laboratory, may reach, access and/or process information deposited on a distributed data server.

The dosimeter may include a GPS that enables mobile communication device to determine the position of a radiological event. A GPS radio in the mobile communication device provides an alternative means of the determining the position of the integrated sensor module. If the integrated sensor module has been paired with a mobile communication device, the mobile communication device may preferentially use a GPS sensor to determine location to minimize its own power consumption.

The wireless network may be configured to communicate with a public data network (e.g., the Internet). A remote data server including a processor to process the raw data from a dosimeter may be configured to communicate with a public data network (e.g., the Internet).

With an electronic data transmission link formed between a mobile communication device and a remote data server, an integrated sensor module is capable of transmitting measured raw data s to an ultra-low-power wireless-enabled mobile communication device (e.g., a smart phone, tablet or other mobile or non-mobile network device) to leverage the mobile device's existing data or cellular network to communicate collected information to a central web server where the data may be processed to generate numerically optimized radiation dose calculations and, optionally, to use the mobile communication device GPS, or to process the collected data to generate numerically optimized radiation dose calculations using the mobile communication device CPU. Currently, standalone sensor devices have limited power capacity that must be conserved as much as possible in order to extend battery life. Ultra-low-power wireless communication minimizes the power consumption of device for regular updates. Furthermore, typical data or cellular communication antennas can consume significant power, so utilizing an external mobile communication device also limits the complexity of radiation sensor.

In one embodiment of the present invention, the use of an ultra-low-power wireless transmission capability allows transmission of measured sensor readings from integrated sensor module to a wireless-enabled mobile device (e.g., a smartphone or tablet device, etc.) that may include a processor for processing of the raw data (sensor readings), and the transmission of this information over a wireless data network to an Internet-based server that may include a processor for processing of the raw data (sensor readings). This enables the analysis and reporting of measured doses for individual detectors employing an integrated sensor module without having to physically send the dosimeter itself to a central location for reading and analysis, which can reduce costs and minimize the time required to receive data and perform critical analysis. Embodiments of the present invention also allow for multiple systems to receive a plurality of measured doses from a plurality of dosimeters having and integrated sensor module. The collection of sensor data from multiple systems enables the analysis and visualization and geographic-based mapping of exposure sources and related population-based trends over time. The connection to the Internet also enables the remote update and troubleshooting of the device.

In one embodiment of the present invention, the radiation dose calculation algorithm employs an optimization step to find the set of parameters (the solution vector) that best predicts an unknown radiation field from the given dose readings. The best prediction of the radiation field is determined by using the known radiation field values to minimize an objective function. The optimization step can be chosen to optimize for speed, accuracy, or memory, as needed, by either employing a single optimization step (such as a chi-squared minimization algorithm), which achieves acceptable accuracy in the shortest amount of time and smallest amount of memory, or an iterative optimization procedure (such as a heuristic minimization algorithm), which achieves better accuracy at the cost of more time and greater memory utilization.

In one embodiment of the present invention, the numerical optimization procedure is implemented in a single-step, where the objective function takes the form of the squared difference between the measured and stored detector responses. The algorithm consists of predicting the radiation field that most likely produced the measured values by finding the solution vector that minimizes the chi squared function shown below. This is described in [16] and herein incorporated by reference.

$$s_j = \sqrt{\sum_{i=1}^{4}\left(\frac{G_{ij}-\overline{G}_j}{\sigma_{ij}\overline{G}_j}\right)^2}$$

The numerical optimization procedure can also be implemented using an iterative process. A well-known example of iterative optimization is regression using gradient descent [16]. However, such methods cannot readily incorporate heuristic rules to guide the optimization procedure and ensure that it convergences to a solution that meets known constraints. An example of an iterative numerical optimization procedure that enables the use of heuristic rules is the Genetic Algorithm [8]. Genetic Algorithms can be used to find the optimal set of weighting parameters (the solution vector) for the proposed dose calculation algorithm. Genetic Algorithms have been successfully used in automated image segmentation systems to find the optimal set of parameters to minimize the energy function used in Active Contour Models (ACM) and Level Set Methods (LSM). For example, in [8], Xu, et al, used Genetic Algorithms to vary the parameters of the ACM energy function until the contours produced by the ACM algorithm closely matched the training set.

Another example of an iterative numerical optimization procedure is the class of heuristic optimization techniques known as Harmony Algorithms [17]. The solution vector in Genetic Algorithms is typically produced by combining two "parent" solution vectors using heuristic rules that are based upon evolutionary adaptation (i.e., the two "parent" solution vectors are combined to produce a "child" solution vector. Harmony Algorithms improve upon Genetic Algorithms by expanding the "parent" solution vector to a much larger pool of potential solution vectors, which thereby enables the Harmony Algorithm to converge to the optimal solution in a shorter amount of time.

In another embodiment of the present invention, the Harmony Algorithm was used to implement the objective function given below.

$$\min = \sum_{i}\left(cv_i^{MEAS} - \sum_{j}W_j cv_{ij}^{RMx}\right)^2$$

REFERENCES

The following references are referred to above and are incorporated herein by reference:
1. Akselrod, M. S., Lucas, A. C., Polf, J. C., McKeever, S. W. S., "Optically stimulated luminescence of Al$_2$O$_3$:C," *Radiation Measurements*, 29, (3-4), 391-399 (1998).
2. Akslerod, M. S., Kortov, V. S., and Gorelova, E. A., "Preparation and properties of Al$_2$O$_3$:C," *Radiat. Prot. Dosim.* 47, 159-164 (1993).
3. Klemic, G., Bailey, P., Miller, K., Monetti, M., "External radiation dosimetry in the aftermath of radiological terrorist event," *Rad. Prot. Dosim*, in press.
4. Lars Botter-Jensen et al., *Optically Stimulated Luminescence Dosimetry*, Elesevier (2003).
5. Stanford, N., Whole Body Dose Algorithm for the Landauer InLight Next Generation Dosimeter, Algorithm Revision: Next Gen IEC (Sep. 13, 2010).
6. Stanford, N., Whole Body Dose Algorithm for the Landauer InLight Next Generation Dosimeter, Algorithm Revision: Next Gen NVLAP (Sep. 27, 2010).
7. Stanford, N., "Linear vs. Functional-Based Dose Algorithm Designs," *Rad. Prot. Dosim.* 144 (1-4). 253-256 (2011).
8. Xu, Yuan; Neu, Scott; Owens, Chester J.; Owens, Janis F.; Sklansky. Jack; Valentino, Daniel J., "Optimization of active-contour model parameters using genetic algorithms: segmentation of breast lesions in mammograms. Proc. SPIE 4684, Medical Imaging 2002: Image Processing," 1406, May 15, 2002; doi: 10.1117/12.467106.
9. U.S. Pat. No. 6,846,434 to Akselrod.
10. U.S. Pat. No. 6,198,108 to Schwietzer et al.
11. U.S. Pat. No. 6,172,368 to Tarr.
12. U.S. Pat. No. 6,127,685 to Yoder et al.
13. U.S. Pat. No. 5,739,541 to Kahilainen.
14. U.S. Pat. No. 5,731,590 to Miller.
15. U.S. patent application Ser. No. 10/768,094 to Akselrod et al.
16. J. A. Snyman, Practical Mathematical Optimization: An introduction to Basic Optimization Theory and Classical and New Gradient-based Algorithms. Springer Publishing (2005); ISBN 0-387-24348-8.
17. X. S. Yang, "Harmony Search as a Metaheuristic Algorithm." in: Music-Inspired Harmony Search Algorithm: Theory and Applications, Studies in Computational Intelligence, Springer Berlin, vol. 191, pp. 1-14 (2009).

While the present invention has been disclosed with references to certain embodiments, numerous modifications, alterations, and changes to the described embodiments are possible without departing from the spirit and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus comprising: one or more processors, and a machine-readable medium for storing instructions thereon which when executed by the one or more processors cause the one or more processors to perform operations comprising the following steps:
   (a) determining radiation dose values for a response matrix by determining a radiation dose value for each radiation field in a response matrix from a plurality of detector elements of a dosimeter,
   (b) determining a final net radiation dose value for each radiation field in the response matrix, and
   (c) displaying the final net radiation dose value for each radiation field in the response matrix to a user and/or saving the final net radiation dose value for each radiation field to a first storage medium,
   wherein each radiation field has a radiation source,
   wherein step (b) comprises conducting a numerical optimization process comprising the following steps:

(i) generating an initial solution vector for each radiation field,
(ii) iteratively updating the initial solution vector for each radiation field until an objective function is minimized to thereby generate an optimal solution vector, and
(iii) determining a radiation dose value for each radiation field based on the optimal solution vector for the source,
wherein the objective function is $$s_j = \sqrt{\sum_{i=1}^{4}\left(\frac{G_{ij}-\overline{G}_j}{\sigma_{ij}\overline{G}_j}\right)^2} \quad s_j = \sqrt{\sum_{i=1}^{4}\left(\frac{G_{ij}-\overline{G}_j}{\sigma_{ij}\overline{G}_j}\right)^2}$$

where i is the number of detector elements of the dosimeter,
where j is the number of radiation fields,
where $\overline{G}_j$ is are expected values of one or more dose conversion factors for radiation field j,
where $G_{ij}$ is the dose computed for the $i^{th}$ element of the dosimeter and the $j^{th}$ radiation field,
where $\sigma_{ij}$ is a total uncertainty of a stored response for the $i^{th}$ detector element of the dosimeter and $j^{th}$ radiation field, and
wherein each stored response is one of a plurality of stored responses stored on a second storage medium.

2. The apparatus of claim 1, wherein the machine-readable medium, the first storage medium and the second storage medium are the same storage medium.

3. The apparatus of claim 1, wherein step (b) comprises the following steps:
(d) checking error conditions for each final radiation dose value to thereby determine if error conditions exist for each radiation dose value, and
(e) displaying the error conditions determined in step (d) to the user and/or saving the error conditions determined in step (d) to the first storage medium.

4. The apparatus of claim 1, wherein step (b) comprises assessing radiation quality of the radiation dose values.

5. The apparatus of claim 1, wherein step (b) comprises determining an accurate assessment of ionizing radiation dose with an optimized data-fitting procedure.

6. The apparatus of claim 1, wherein step (b) comprises determining the final net radiation dose value for each radiation field in the response matrix based on a response matrix weighting factor.

7. The apparatus of claim 1, wherein step (b) comprises determining the final net radiation dose value for each radiation field in the response matrix based on: a product of a response matrix weighting factor, an expected source dose, and a dose conversion factor for the radiation field.

8. The apparatus of claim 1, wherein step (b) comprises determining the final net radiation dose value for each radiation field in the response matrix based on personal dose equivalent values for $H_p(10\text{ mm})$, $H_p(0.07\text{ mm})$, and $H_p(3\text{ mm})$ for each radiation field.

9. The apparatus of claim 1, wherein step (b) comprises determining the final net radiation dose value for each radiation field in the response matrix based on a background dose for the radiation field.

10. The apparatus of claim 1, wherein step (b) comprises determining the final net radiation dose value for each radiation field in the response matrix based on one or more noise sample for the dosimeter.

11. The apparatus of claim 1, wherein step (c) comprises displaying dosimeter readout data, background dose data, and response matrix data.

12. The apparatus of claim 1, wherein step (c) comprises saving dosimeter readout data, background dose data, and response matrix data to the second storage medium.

13. The apparatus of claim 1, wherein step (c) comprises displaying dose distributions for each radiation field to the user.

14. The apparatus of claim 1, wherein step (c) comprises saving dose distributions for each radiation field to the second storage medium.

15. The apparatus of claim 1, wherein step (c) comprises displaying the final net radiation dose value for each radiation field in the response matrix to the user.

16. The apparatus of claim 1, wherein step (c) comprises saving the final net radiation dose value for each radiation field in the response matrix to the first storage medium.

17. A non-transitory machine-readable medium having stored thereon sequences of instructions, which when executed by one or more processors, cause one or more electronic devices to perform a set of operations comprising the following steps:
(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium,
wherein each radiation field has a radiation source,
wherein step (b) comprises conducting a numerical optimization process comprising the following steps:
(i) generating an initial solution vector for each radiation field,
(ii) iteratively updating the initial solution vector for each radiation field until an objective function is minimized to thereby generate an optimal solution vector, and
(iii) determining a radiation dose value for each radiation field based on the optimal solution vector for the source,
wherein the objective function is $$s_j = \sqrt{\sum_{i=1}^{4}\left(\frac{G_{ij}-\overline{G}_j}{\sigma_{ij}\overline{G}_j}\right)^2}$$

where i is the number of detector elements of the dosimeter,
where j is the number of radiation fields,
where $\overline{G}_j$ is are expected values of one or more dose conversion factors for radiation field j,
where $G_{ij}$ is the dose computed for the $i^{th}$ element of the dosimeter and the $j^{th}$ radiation field, and
where $\sigma_{ij}$ is a total uncertainty of a stored response for the $i^{th}$ detector element of the dosimeter and $j^{th}$ radiation field, and
wherein each stored response is one of a plurality of stored responses stored on a second storage medium.

18. The non-transitory machine-readable medium of claim 17, wherein the machine-readable medium, the first storage medium and the second storage medium are the same storage medium.

19. The non-transitory machine-readable medium of claim 17, wherein step (b) comprises the following steps: (d) checking error conditions for each final radiation dose value to thereby determine if error conditions exist for each radiation dose value, and (e) displaying the error conditions determined in step (d) to the user and/or saving the error conditions determined in step (d) to the first storage medium.

20. The non-transitory machine-readable medium of claim 17, wherein step (b) comprises assessing radiation quality of the radiation dose values.

21. The non-transitory machine-readable medium of claim 17, wherein step (b) comprises determining an accurate assessment of ionizing radiation dose with an optimized data-fitting procedure.

22. The non-transitory machine-readable medium of claim 17, wherein step (b) comprises determining the final net radiation dose value for each radiation field in the response matrix based on a response matrix weighting factor.

23. The non-transitory machine-readable medium of claim 17, wherein step (b) comprises determining the final net radiation dose value for each radiation field in the response matrix based on: a product of a response matrix weighting factor, an expected source dose, and a dose conversion factor for the radiation field.

24. The non-transitory machine-readable medium of claim 17, wherein step (b) comprises determining the final net radiation dose value for each radiation field in the response matrix based on personal dose equivalent values for $H_p(10$ mm$)$, $H_p(0.07$ mm$)$, and $H_p(3$ mm$)$ for each radiation field.

25. The non-transitory machine-readable medium of claim 17, wherein step (b) comprises determining the final net radiation dose value for each radiation field in the response matrix based on a background dose for the radiation field.

26. The non-transitory machine-readable medium of claim 17, wherein step (b) comprises determining the final net radiation dose value for each radiation field in the response matrix based on one or more noise sample for the dosimeter.

27. The non-transitory machine-readable medium of claim 17, wherein step (c) comprises displaying dosimeter readout data, background dose data, and response matrix data.

28. The non-transitory machine-readable medium of claim 17, wherein step (c) comprises saving dosimeter readout data, background dose data, and response matrix data to the second storage medium.

29. The non-transitory machine-readable medium of claim 17, wherein step (c) comprises displaying dose distributions for each radiation field to the user.

30. The non-transitory machine-readable medium of claim 17, wherein step (c) comprises saving dose distributions for each radiation field to the second storage medium.

31. The non-transitory machine-readable medium of claim 17, wherein step (c) comprises displaying the final net radiation dose value for each radiation field in the response matrix to the user.

32. The non-transitory machine-readable medium of claim 17, wherein step (c) comprises saving the final net radiation dose value for each radiation field in the response matrix to the first storage medium.

33. A method comprising the following steps:
(a) determining radiation dose values for a response matrix by determining a radiation dose value for each radiation field in a response matrix from a plurality of detector elements of a dosimeter,
(b) determining a final net radiation dose value for each radiation field in the response matrix, and
(c) displaying the final net radiation dose value for each radiation field in the response matrix to a user and/or saving the final net radiation dose value for each radiation field to a first storage medium,
wherein each radiation field has a radiation source,
wherein step (b) comprises conducting a numerical optimization process comprising the following steps:
(i) generating an initial solution vector for each radiation field,
(ii) iteratively updating the initial solution vector for each radiation field until an objective function is minimized to thereby generate an optimal solution vector, and
(iii) determining a radiation dose value for each radiation field based on the optimal solution vector for the source,
wherein the objective function is $$s_j = \sqrt{\sum_{i=1}^{4}\left(\frac{G_{ij} - \overline{G}_j}{\sigma_{ij}\overline{G}_j}\right)^2}$$

where i is the number of detector elements of the dosimeter,
where j is the number of radiation fields,
where $G_{ij}$ is are expected values of one or more dose conversion factors for radiation field j,
where $\overline{G}_{ij}$ is the dose computed for the $i^{th}$ element of the dosimeter and the $j^{th}$ radiation field, and
where $\sigma_{ij}$ is a total uncertainty of a stored response for the $i^{th}$ detector element of the dosimeter and $j^{th}$ radiation field, and
wherein each stored response is one of a plurality of stored responses stored on a second storage medium.

34. The method of claim 33, wherein the machine-readable medium, the first storage medium and the second storage medium are the same storage medium.

35. The method of claim 33, wherein step (b) comprises the following steps:
(d) checking error conditions for each final radiation dose value to thereby determine if error conditions exist for each radiation dose value, and
(e) displaying the error conditions determined in step (d) to the user and/or saving the error conditions determined in step (d) to the first storage medium.

36. The method of claim 33, wherein step (b) comprises assessing radiation quality of the radiation dose values.

37. The method of claim 33, wherein step (b) comprises determining an accurate assessment of ionizing radiation dose with an optimized data-fitting procedure.

38. The method of claim 33, wherein step (b) comprises determining the final net radiation dose value for each radiation field in the response matrix based on a response matrix weighting factor.

39. The method of claim 33, wherein step (b) comprises determining the final net radiation dose value for each radiation field in the response matrix based on: a product of a response matrix weighting factor, an expected source dose, and a dose conversion factor for the radiation field.

40. The method of claim 33, wherein step (b) comprises determining the final net radiation dose value for each radiation field in the response matrix based on personal dose equivalent values for $H_p(10$ mm$)$, $H_p(0.07$ mm$)$, and $H_p(3$ mm$)$ for each radiation field.

41. The method of claim 33, wherein step (b) comprises determining the final net radiation dose value for each radiation field in the response matrix based on a background dose for the radiation field.

42. The method of claim 33, wherein step (b) comprises determining the final net radiation dose value for each radiation field in the response matrix based on one or more noise sample for the dosimeter.

43. The method of claim 33, wherein step (c) comprises displaying dosimeter readout data, background dose data, and response matrix data.

44. The method of claim 33, wherein step (c) comprises saving dosimeter readout data, background dose data, and response matrix data to the second storage medium.

45. The method of claim 33, wherein step (c) comprises displaying dose distributions for each radiation field to the user.

46. The method of claim 33, wherein step (c) comprises saving dose distributions for each radiation field to the second storage medium.

47. The method of claim 33, wherein step (c) comprises displaying the final net radiation dose value for each radiation field in the response matrix to the user.

48. The method of claim 33, wherein step (c) comprises saving the final net radiation dose value for each radiation field in the response matrix to the first storage medium.

* * * * *